(12) United States Patent
Ye

(10) Patent No.: US 8,746,726 B2
(45) Date of Patent: Jun. 10, 2014

(54) TRAILER COUPLER

(75) Inventor: Yibin Ye, Portland, OR (US)

(73) Assignee: Pacific Rim International, LLC, Portland, OR (US)

( * ) Notice: Subject to any disclaimer, the term of this patent is extended or adjusted under 35 U.S.C. 154(b) by 78 days.

(21) Appl. No.: 13/485,785

(22) Filed: May 31, 2012

(65) Prior Publication Data

US 2012/0306180 A1 Dec. 6, 2012

Related U.S. Application Data

(60) Provisional application No. 61/491,840, filed on May 31, 2011.

(51) Int. Cl.
*B60D 1/06* (2006.01)

(52) U.S. Cl.
USPC .......................................................... 280/512

(58) Field of Classification Search
USPC ................................. 280/511, 512
See application file for complete search history.

(56) References Cited

U.S. PATENT DOCUMENTS

| | | | |
|---|---|---|---|
| 1,272,486 A | 7/1918 | McManis | |
| 1,636,295 A | 7/1927 | Dempsey | |
| 2,072,473 A | 3/1937 | Baumberger | |
| 2,204,882 A | 6/1940 | Berluti | |
| 2,260,442 A | 10/1941 | Dollase | |
| 2,438,749 A | 3/1948 | Harrer | |
| 2,530,554 A | 11/1950 | Tinnerman | |
| 3,088,752 A | 5/1963 | Dressen | |
| 3,374,268 A | 3/1968 | Groves | |
| 3,433,503 A | 3/1969 | Davis | |
| 3,788,673 A | 1/1974 | Gloege | |
| 3,820,823 A * | 6/1974 | Beaston | 80/512 |
| 3,831,982 A | 8/1974 | Bernhardt et al. | |
| 3,893,713 A | 7/1975 | Ivy | |
| 4,018,453 A | 4/1977 | Bigelow | |
| 4,082,168 A | 4/1978 | Cole et al. | |
| 4,225,261 A | 9/1980 | Marx | |
| 4,276,850 A | 7/1981 | Valencia | |
| 4,283,073 A | 8/1981 | Gostomski et al. | |
| 4,320,907 A * | 3/1982 | Eaton | 280/511 |
| 4,352,596 A | 10/1982 | Hammett | |
| 4,388,012 A | 6/1983 | Erickson | |

(Continued)

OTHER PUBLICATIONS

Redneck Trailer Supplies, parts catalog pages for gooseneck couplers, Dec. 2009.

(Continued)

*Primary Examiner* — Kevin Hurley
(74) *Attorney, Agent, or Firm* — Kolisch Hartwell, P.C.

(57) ABSTRACT

A trailer coupler may be provided with an opening and socket for a hitch ball, and a clamping bar in an internal channel for locking the coupler and hitch together. The internal channel may extend horizontally and be positioned above the opening and below the socket. The channel may include a laterally-facing aperture adjacent the second end, out of which one end of the clamping bar may extend. That end of the clamping bar may include a bracket with an open channel to fit over a flange on the coupler body. The coupler may be assembled by inserting a first end of the clamping bar through the laterally-facing aperture, and moving the first end of the clamping bar into the coupler body channel while fitting the bracket over the flange at the open channel of the clamping bar.

18 Claims, 5 Drawing Sheets

(56) References Cited

U.S. PATENT DOCUMENTS

| | | | |
|---|---|---|---|
| 4,560,184 A | | 12/1985 | Williams |
| 4,685,695 A | | 8/1987 | LeVee |
| 4,778,196 A | * | 10/1988 | Spoliansky .................. 280/512 |
| 4,854,604 A | | 8/1989 | Stallsworth |
| 4,913,078 A | | 4/1990 | Haverly |
| 4,925,205 A | * | 5/1990 | Villalon et al. .............. 280/507 |
| 4,958,847 A | | 9/1990 | Williams |
| 5,147,096 A | | 9/1992 | Rogers |
| 5,181,405 A | | 1/1993 | Wheeler |
| 5,192,176 A | | 3/1993 | Roberts |
| 5,263,735 A | | 11/1993 | Mann |
| 5,326,213 A | | 7/1994 | Roberts |
| 5,354,087 A | | 10/1994 | Head |
| 5,382,109 A | * | 1/1995 | Nyman ......................... 403/316 |
| 5,385,363 A | | 1/1995 | Morey |
| 5,482,309 A | * | 1/1996 | Hollis ........................ 280/423.1 |
| 5,683,094 A | | 11/1997 | Gullickson |
| 6,186,532 B1 | * | 2/2001 | Ray et al. ..................... 280/508 |
| 6,464,241 B1 | * | 10/2002 | Daniel ......................... 280/512 |
| 6,467,793 B2 | * | 10/2002 | Putnam ........................ 280/508 |
| 7,378,013 B2 | * | 5/2008 | Sandler ........................ 280/507 |
| 2004/0195801 A1 | | 10/2004 | Lara |

OTHER PUBLICATIONS

Butler Products, catalog, Dec. 2010.

* cited by examiner

TRAILER COUPLER

CROSS-REFERENCE TO RELATED APPLICATION

The present application claims priority to the following U.S. Provisional Patent Application Ser. No. 61/491,840 filed May 31, 2011. This application is hereby incorporated by reference into the present disclosure for all purposes.

BACKGROUND

The present invention relates to a structure and components for a trailer coupler that attaches to the hitch ball of a towing vehicle. The structure and components are particularly suited to the gooseneck variety of trailer couplers but may also be used in other varieties of couplers. Gooseneck couplers typically extend downwardly from a nose of the trailer and provide a socket to receive a hitch ball. Such couplers typically include at a lowermost position a locking plate having a hole that can be aligned with the socket to receive the hitch ball, and misaligned so as to retain the hitch ball in the socket

BRIEF SUMMARY

According to one embodiment of the present invention, a trailer coupler for installation at a forward end of a trailer may be configured to attach to a hitch of a towing vehicle. The coupler may include an opening for the hitch ball, a socket to receive the ball, and an internal channel for a clamping bar. The internal channel may extend horizontally and be positioned above the opening and below the socket. The channel may include a laterally-facing aperture adjacent the second end, out of which one end of the clamping bar may extend. That end of the clamping bar may include a bracket with an open channel to fit over a flange on the coupler body.

According to an embodiment of the present invention, a method of assembling a trailer coupler may include inserting a first end of the clamping bar through the laterally-facing aperture, and moving the first end of the clamping bar into the coupler body channel while fitting the bracket over the flange at the open channel of the clamping bar.

DETAILED DESCRIPTION

Figure 1:
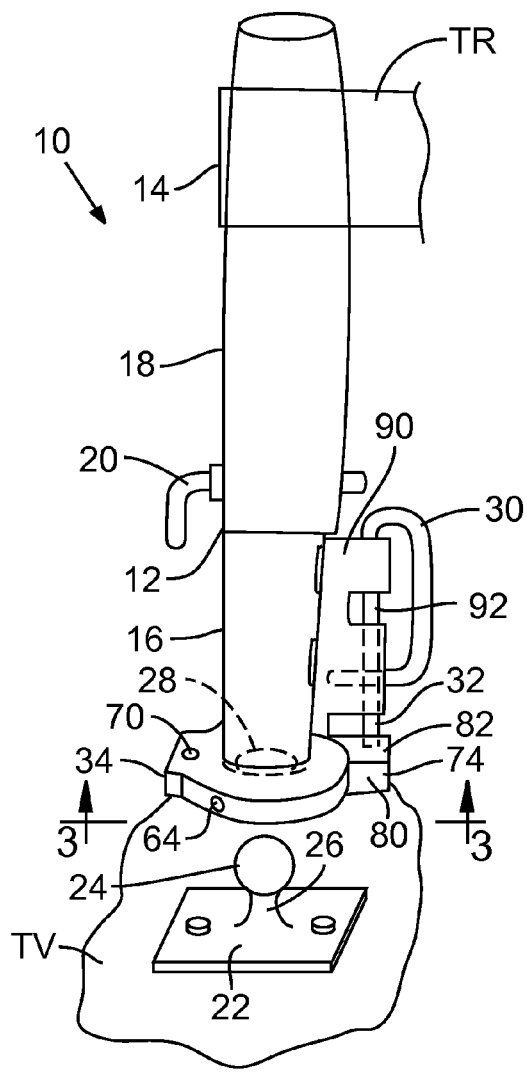
FIG. 1 is a perspective view of a trailer coupler according to an embodiment of the present disclosure, showing portions of the trailer and towing vehicle and the hitch as well as the main shaft and coupler body with a handle to position and control the locking of the coupler.
Figure 2:
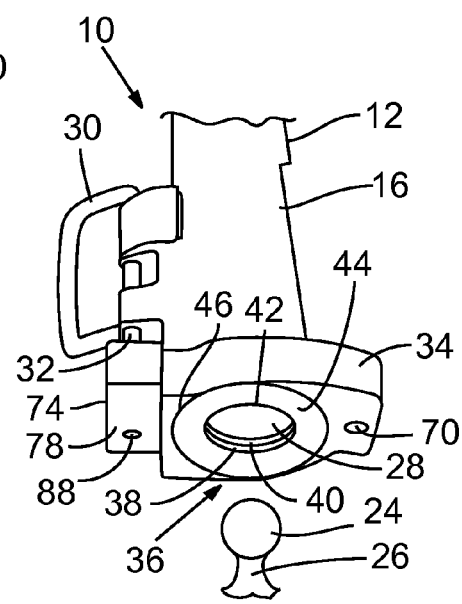
FIG. 2 is a perspective view of the trailer coupler of FIG. 1, partially from below, showing the opening for the ball and the clamping bar above the opening.

As shown in FIGS. 1 and 2, a trailer coupler 10 in accordance with the present description has an external appearance much the same as conventional trailer couplers of the gooseneck variety. Trailer coupler 10 may include an upwardly extending pipe, tube, or shaft 12 for attachment to a trailer TR at a brace or bracket 14 at the front or forward end of trailer TR. Shaft 12 may be in one or two sections 16, 18 or otherwise configured for adjustability in height, for example, as controlled by the relative positioning of sections 16, 18 as fixed by a pin 20.

Trailer coupler 10 may be coupled to a towing vehicle TV at a hitch 22 that typically includes a ball 24 and a neck 26 below the ball. When coupled, ball 24 is inside coupler 10 and a socket 28 rests on ball 24, allowing for articulation of the trailer relative to the towing vehicle with the general degrees of freedom associated with a ball-and-socket arrangement.

A handle 30 with a locking pin 32 is operable to lock the coupler onto the ball to prevent disconnection of the hitch and coupler, while still allowing relative rotational movements at the ball-and-socket interface. The operation and structure appears generally the same as for conventional gooseneck trailer couplers, however an external difference is that a coupler body 34, which conventionally is a two-piece combination of a socket body with a locking plate, may be formed in a single piece, preferably by casting.

In the coupler body of the present embodiment, a downwardly-facing opening 36 is configured to allow ball 24 to pass therethrough and into socket 28 above opening 36. Socket 28 receives ball 24 in a mating arrangement allowing rotational movement as described above.

As will be described in more detail for FIGS. 3-6, a clamping bar 38 in coupler body 34 may be positioned between opening 36 and socket 28, that is, above opening 36 and below socket 28. Clamping bar 38 may be operated to a locked position (shown in FIG. 2) which will hold ball 24 in socket 28 and prevent the ball from passing back out through the opening. Clamping bar 38 is held in the locked position by lock pin 32 as will be further described. Typically, in the locked position, a curved middle portion 40 of clamping bar 38 is positioned to partially block opening 36 and may contact neck 26 of ball 24. This positioning of clamping bar 38 tends to hold the ball in the socket.

Figure 3:
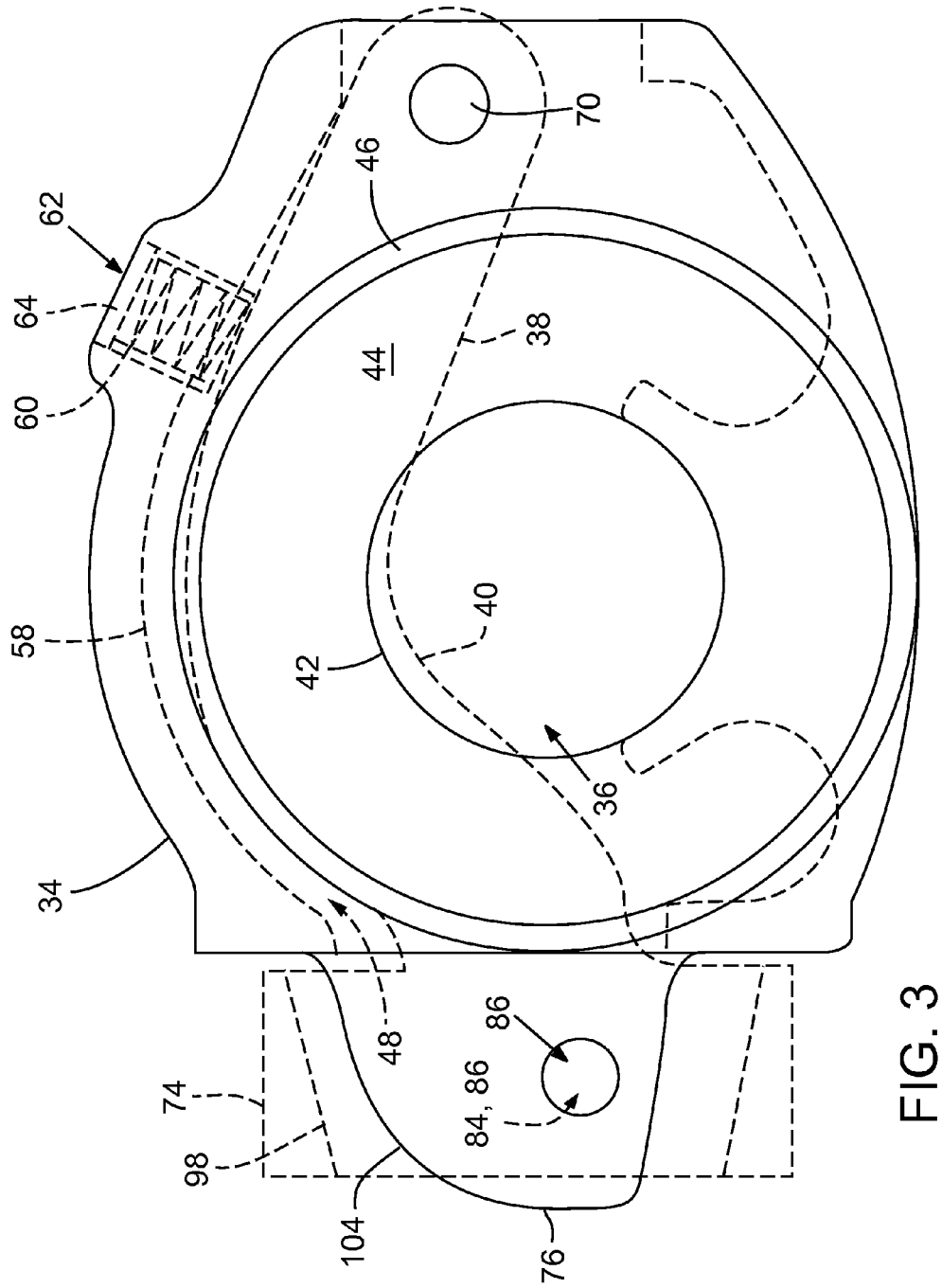
FIG. 3 is a view from directly below the trailer coupler showing a flange with a locking hole, and, in phantom lines, the clamping bar, and a channel and a spring for the clamping bar.

As seen in FIGS. 2-3, opening 36 may be defined by a circular edge 42 that typically is an upper end of a frustoconical section 44 that has a lower end 46. Section 44 may be useful in guiding ball 24 into and through opening 36 when initially misaligned.

Figure 4A:
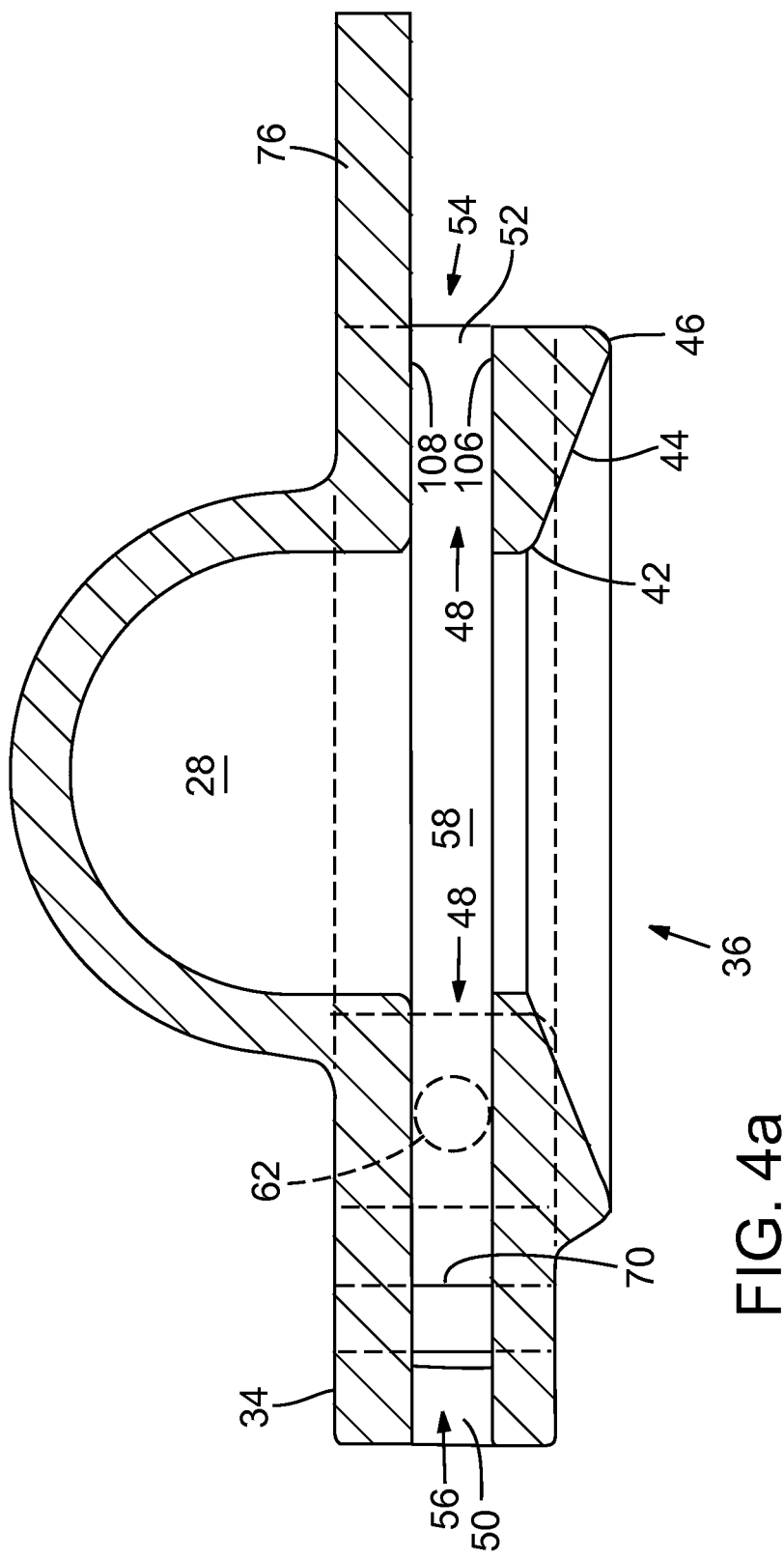
FIGS. 4a and 4b are cross-sectional views of the coupler body, both without and with the clamping bar installed, respectively.

As best seen in FIG. 4a, with clamping bar 38 removed, coupler body 34 includes an internal channel 48 extending horizontally between a first end 50 and a second end 52. Internal channel 48 is preferably positioned above opening 36 and its circular edge 42, and below socket 28.

Internal channel 48 typically includes a laterally-facing aperture 54 adjacent second end 52, and may also include another laterally facing aperture 56 adjacent its first end 50. One or both of the laterally-facing apertures may be used during assembly for insertion and installation of clamping bar 38.

A side wall 58, preferably a portion of the single-piece, uni-body casting of coupler body 34, may enclose a side of channel 48. A biasing member, such as a spring 60 may be installed in side wall 58, or elsewhere, as suited to biasing clamping bar 38 into the locked position. Spring 60 may be installed in a through-hole 62 in wall 58, and then held in place by a welded closure 64 or a nut threaded into place, or installed by any other suitable means.

Figure 4B:
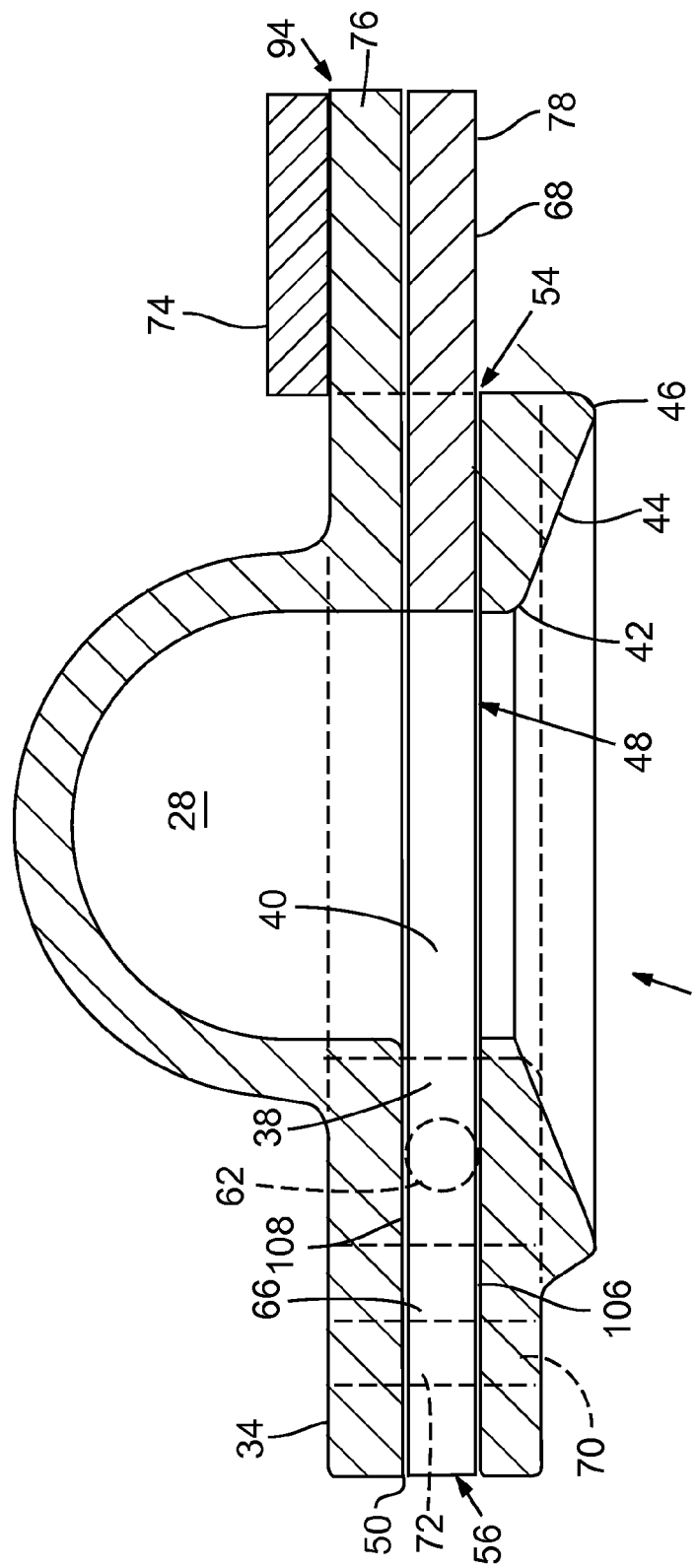
Figure 5:
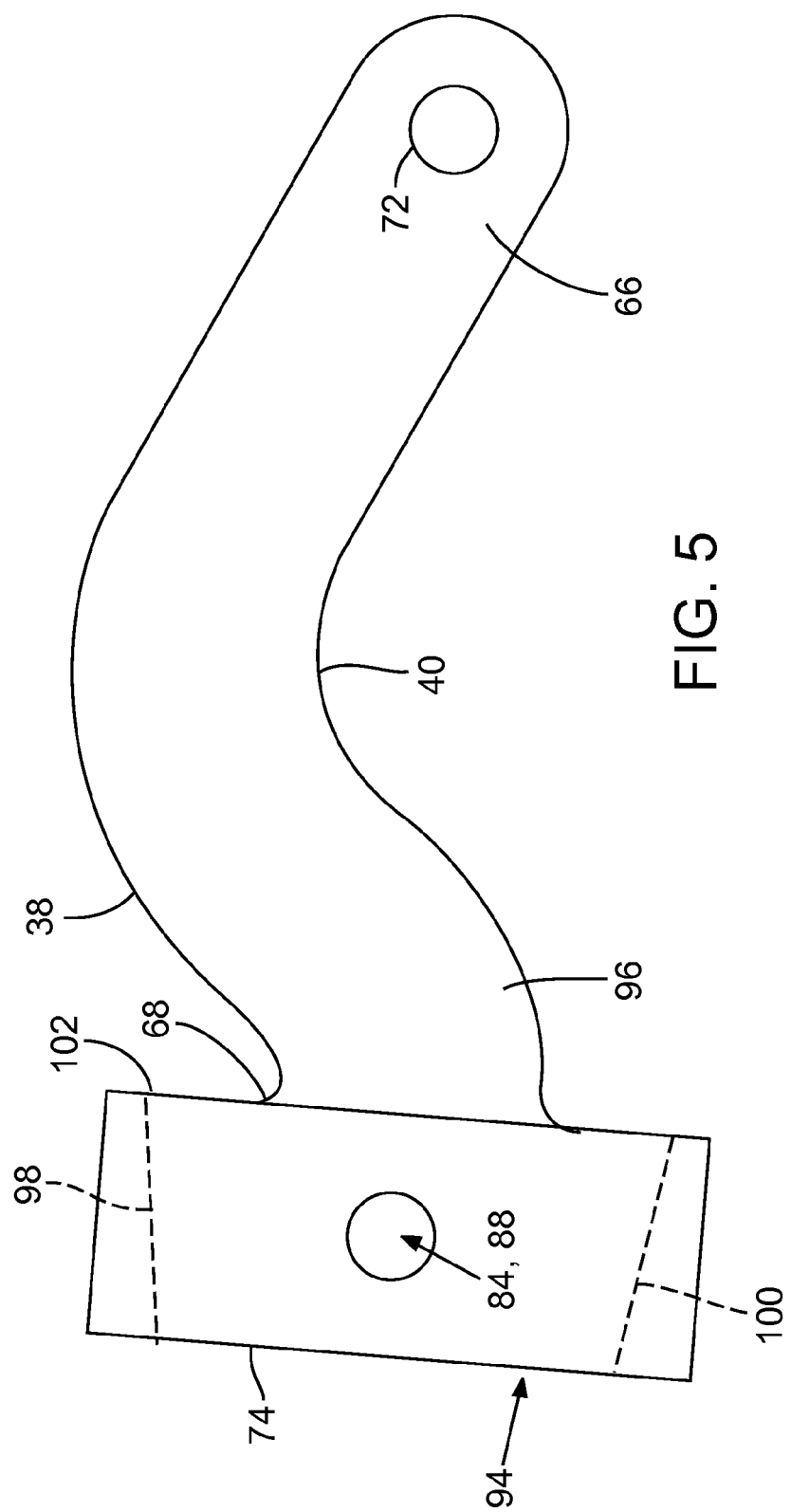
FIG. 5 is a plan view of the clamping bar.

As seen in FIG. 4b, clamping bar 38 may define a first end 66 within first end 50 of channel 48. Clamping bar 38 typically includes curved middle portion 40 adjacent opening 36.

Clamping bar 38 may have a second end 68 extending out of laterally-facing aperture 54 of channel 48.

Clamping bar 38 is preferably movable between an open position and the locked position (FIGS. 2 and 3). In the open position, the clamping bar is typically substantially clear of opening 36 to allow ball 24 to pass therethrough. For movement between the positions, clamping bar 38 may be mounted on a pivot joint, such as one formed by a rod or bolt 70 in coupler body 34 adjacent first end 50 of channel 48. Rod or bolt 70 may be held in place in coupler body 34 by any suitable means such as welding or fastening with a nut, and clamping bar 38 may be mounted thereon at a through-hole 72. Such a pivot joint allows pivotal movement of the clamping bar between the locked position and the open position.

Second end 68 of clamping bar 38 typically includes a bracket 74 that fits over a flange or protrusion 76 on coupler body 34. Bracket 74 may include a lower portion 78, side portions 80 and upper portion 82. Preferably, holes 84, 86, and 88 are provided through upper portion 80, flange 76, and lower portion 78, respectively. The holes are positioned to be aligned when clamping bar 38 is in the locked position. Locking pin 32 on handle 30, in the locked position preferably extends through holes 84, 86, and 88.

Handle 30 is typically spring-loaded downwardly to hold the pin in the locked position. Handle 30 may be associated with a sheath 90 mounted on shaft 12 that supports the handle and provides a detent 92 to which handle 30 may be shifted to hold the locking pin 32 away from holes 84, 86, and 88.

As noted above, coupler 34 is preferably formed in a single casting to have a unitary body with features such as socket 28, opening 36, frustoconical section 44, channel 48, and/or lateral openings 54, 56 already formed therein. Coupler body 34 may be machined and/or otherwise processed to form one or more of its features.

Installation of clamping bar 38 may be facilitated by lateral openings 54, 56, and by the particular shape of bracket 74 and flange 76. For example, clamping bar 38 may be inserted into channel 48 starting with first end 66 of bar 38 at channel aperture 54. By this method, clamping bar 38 may be moved within channel 48 until first end 66 is adjacent channel first end 50. Alignment of hole 72 for insertion of rod or bolt 70 may be facilitated by access to bar 38 via channel aperture 56.

The curvature of bar 38, as well the shape and size of an open channel 94 through bracket 74 may be coordinated with a shape of flange 76 to facilitate insertion of bar 38 into channel 48. For example, bar 38 may be substantially straight between first end 66 and curved middle portion 40 and then curve in an opposite direction at a curved portion 96 between the middle and the second end 68. Bracket 74 may be aligned substantially perpendicularly to second end 68. Open channel 94 of bracket may be provided with side walls 98, 100, one or both of which may be narrowed on an inner side 102 to facilitate installation of bracket 74 over flange 76. A curvature 104 may be provided on flange 76 similarly to facilitate insertion of bracket 74 over flange 76. Channel 48 may be further defined by a floor 106 and ceiling 108.

Spring 60 may be externally inserted through side wall 58 after installation of bar 38. Alternatively, it may be installed in hole 62 prior to installation of the bar 38.

A typical combination of a trailer with a towing vehicle is for the coupler to be part of the trailer and in the orientation as described herein, and the hitch to be part of the towing vehicle and in the orientation as described herein. Alternatively, the coupler may be part of the towing vehicle and the hitch part of the trailer and the orientation of the parts may be switched or otherwise altered. Terms such as downwardly facing opening are to be understood as explaining the preferred embodiment and as incorporating different possible orientations within the scope of the present description.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in any claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A trailer coupler for installation at a forward end of a trailer, the coupler configured to attach to a hitch of a towing vehicle, the hitch defining a ball and a neck below the ball, the coupler comprising:
    a. a coupler body including
        i. a downwardly-facing opening configured to allow the ball to pass therethrough,
        ii. a socket above the opening for receiving the ball,
        iii. an internal channel extending horizontally between a first end and a second end, the internal channel being positioned above the opening and below the socket, the channel including a laterally-facing aperture adjacent the second end,
        iv. a flange adjacent the laterally-facing aperture, and
        v. a side wall enclosing a side of the channel;
    b. a clamping bar defining a first end within the first end of the channel, a curved middle portion adjacent the opening, and a second end extending out of the laterally-facing aperture of the channel, the second end of the clamping bar including a bracket, wherein the bracket includes an open channel and the flange is received therewithin, the clamping bar movable between a locked position and an open position, the curved middle portion of the clamping bar in the locked position being positioned to partially block the opening and configured to contact the neck of the ball to hold the ball in the socket; and
a pivot joint adjacent the first end of the bar and the first end of the internal channel of the coupler body, the pivot joint coupling the clamping bar to the coupler body to allow pivotal movement of the clamping bar between the locked position and the open position, wherein the bracket and the flange cooperate to provide a range of motion for the clamping bar to move between the locked position and the open position.

2. The coupler of claim 1 wherein the coupler body is formed as a one-piece casting.

3. The coupler of claim 1 wherein the clamping bar includes a curved middle portion.

4. The coupler of claim 3, further including a pin selectively operable to hold the clamping bar in the locked position.

5. The coupler of claim 1 wherein the flange is provided with a curvature allowing insertion of the bracket over the flange.

6. The coupler of claim 1 wherein the channel includes another laterally-facing aperture adjacent the first end of the channel.

7. The coupler of claim 1 further comprising a spring biasing the clamping bar toward the locked position.

8. The coupler of claim 7 wherein the coupler body further includes a hole through the side wall and wherein the spring is disposed within the hole.

9. The coupler of claim 1 wherein the locking bar at the first end is attached at a pivot joint to the coupler body.

10. The coupler of claim 1 wherein the coupler body includes a frustoconical section adjacent the opening into the coupler body.

11. A method of assembling a trailer coupler for installation at a forward end of a trailer, the coupler configured to attach to a hitch of a towing vehicle, the hitch defining a ball and a neck below the ball, the method comprising the steps of:
   i. forming a coupler body to have a downwardly-facing opening configured to allow the ball to pass therethrough, a socket above the opening for receiving the ball, an internal channel extending horizontally between a first end and a second end, the internal channel being positioned above the opening and below the socket, the channel including a laterally-facing aperture adjacent the second end, the coupler body further including a side wall enclosing a side of the channel and a flange adjacent the laterally-opening aperture;
   ii. providing a clamping bar defining a first end and a second end, wherein the second end includes a bracket with an open channel therein;
   iii. inserting the first end of the clamping bar through the laterally-facing aperture, and moving the first end of the clamping bar to the first end of the coupler body channel while fitting the bracket over the flange at the open channel of the clamping bar.

12. The method of claim 11 wherein the clamping bar includes a curved middle portion, and the step of moving the clamping bar includes moving the curved middle portion to adjacent the opening of the coupler body.

13. The method of claim 11 wherein the flange of the coupler body includes a curvature that, in the step of moving the clamping bar, facilitates fitting the bracket over the flange.

14. The method of claim 11 further comprising the step of attaching the clamping bar to the coupler body at a pivot joint.

15. The method of claim 11 wherein the step of forming the coupler body includes casting the coupler body.

16. The method of claim 11 wherein the step of forming the coupler body includes providing a hole through the side wall and further including a step of installing a spring within the hole.

17. The method of claim 16 wherein the step of installing the spring includes closing the hole by welding.

18. The method of claim 11 wherein the step of forming the coupler body includes forming another laterally-facing aperture adjacent the first end of the channel in the coupler body.

* * * * *